(No Model.)
C. GRUNDER & J. H. MOYER.
THILL LOOP OR TUG.
No. 279,151. Patented June 12, 1883.
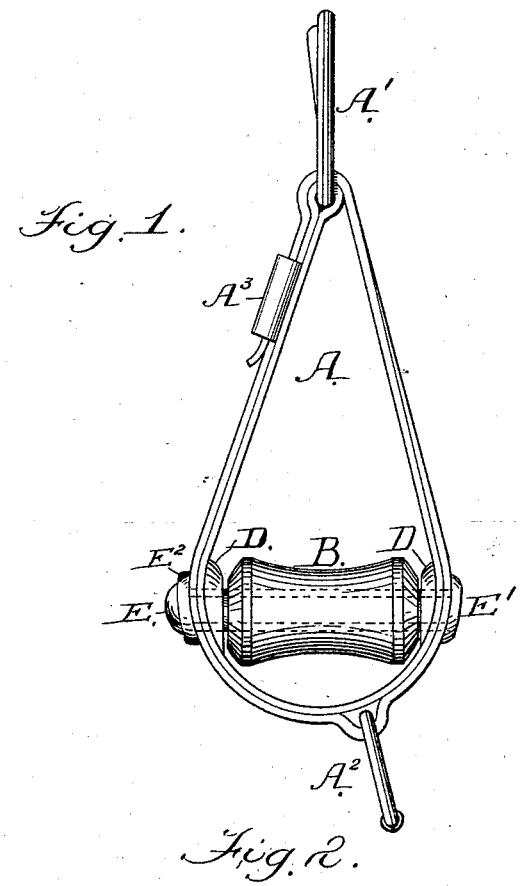
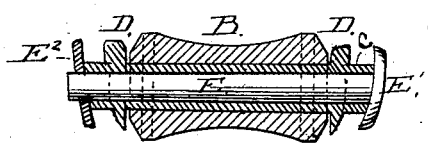
Witnesses:
S. Walter Fowler
H. B. Applewhaite
Inventors
Christian Grunder
— and —
Joseph H. Moyer,
by Thomas P. Kinsey
atty.

UNITED STATES PATENT OFFICE.

CHRISTIAN GRUNDER AND JOSEPH H. MOYER, OF READING, PENNSYLVANIA.

THILL LOOP OR TUG.

SPECIFICATION forming part of Letters Patent No. 279,151, dated June 12, 1883.

Application filed April 11, 1883. (No model.)

*To all whom it may concern:*

Be it known that we, CHRISTIAN GRUNDER and JOSEPH H. MOYER, citizens of the United States, and residents of the city of Reading, county of Berks, and State of Pennsylvania, have invented a new and useful Improvement in Thill Loops or Tugs, of which the following is a specification.

Our invention relates to improvements in leather harness, by which the ordinary thill loop or tug is furnished with an anti-friction roller adapted in every respect to subserve the purpose of metallic or compound metallic and leather loops or tugs.

The accompanying drawings, forming a part of this specification, fully show the manner in which we accomplish the above object, Figure 1 being an elevation of a loop having our improvement applied thereto. Fig. 2 represents a cross-section through the anti-friction roller-pin, bushes, and thimble.

Similar parts are designated by similar letters.

The value of an anti-frictional device in the thill-loop of the harness has long been appreciated; but the impression has also been that the ordinary leather loop could not be adapted to receive the same. Therefore many loops have been devised, of metal, wood, and other materials, in which the part carrying the rollers was in whole or part of such other materials, the difficulty of preserving the form of the loop in leather alone preventing the exclusive use of the same. By our improved mode of inserting the rollers we insure permanence of form in the loop and freedom of revolution for the roller.

A represents the harness-loop as constructed and applied for all general purposes, A' being the buckle to the harness-saddle band; $A^2$, loop for the belly-band; $A^3$, loop for strap end; B, the anti-friction roller, which may be of wood, leather, rubber, or any suitable material, and may have a plain or concave face. C is a thimble or tube, cut to fill out the distance between the sides of the loop at the point at which the bushes are introduced; D are the bushings for the loop-sides. E is a rod with head E', and is passed through the loop from side to side, and upon which the thimble is seated. $E^2$ may be a washer upon which the end of the rod would be riveted, or it may be a nut and the end of the rod threaded, in which case the roller may be more easily renewed.

The improvement is applicable to all carriage or cart harness having the common thill loop or tug, and is applied as follows. Holes are punched opposite each other in the sides of the loop of a size suitable to admit the bushings D. The thimbles C are then cut to fill up the space between the bushings. A roller, B, of a suitable length, and bored so that it shall revolve freely on the thimble C, is placed on the same and held within the loop. The rod E is then inserted and the free end either riveted down upon a washer, $E^2$, or screwed up taut against the bushings by a nut.

The advantage of our improvement is that it gives every horse owner, at a trivial cost and no change of harness, an opportunity of relieving his horse from the jar attendant upon the use of the common loop, which transmits to the harness-saddle all the lateral or advancing movements of the carriage, causing strains and soreness of the back, neck, and shoulders, often unfitting them for use, the anti-friction loops permitting the thills to move freely forward or backward, while it supports their weight, yet does not transfer said movement to the harness, the traces and breeching doing the work. It also provides immunity from accident in unhitching, as the horse can walk right out of the thills without any fear of the loop hanging, as is usual with the ordinary loop.

Having shown our improvement, its application and advantages, we desire to secure by Letters Patent the following claim thereon:

In an ordinary leather thill or shaft loop, A, provided with buckle A', band-loop $A^2$, and box-loop $A^3$, the combination therewith and adaptation thereto of an anti-friction roller, B, movably mounted upon a fixed thimble, C, said thimble distending the loop A to a proper width of opening, and retained in place by the bushes D, rod E, and washer or nut $E^2$, substantially as shown, and for the purpose set forth.

CHRISTIAN GRUNDER.
JOSEPH H. MOYER.

Witnesses:
ISAAC WINTERS,
EZEKIEL JONES.